US012604064B2

(12) United States Patent　(10) Patent No.:　US 12,604,064 B2
Kim et al.　(45) Date of Patent:　Apr. 14, 2026

(54) METHOD AND SERVER FOR PROVIDING CONTENT RECOMMENDATION LIST

(71) Applicant: KAKAO ENTERTAINMENT CORP., Seongnam-si (KR)

(72) Inventors: Jung Eun Kim, Seongnam-si (KR); Ji Yen Choi, Seoul (KR)

(73) Assignee: Kakao Entertainment Corp., Seongnam-si (KR)

( * ) Notice: Subject to any disclaimer, the term of this patent is extended or adjusted under 35 U.S.C. 154(b) by 281 days.

(21) Appl. No.: 18/548,873

(22) PCT Filed: Dec. 15, 2021

(86) PCT No.: PCT/KR2021/019037
　§ 371 (c)(1),
　(2) Date: Sep. 1, 2023

(87) PCT Pub. No.: WO2022/131777
　PCT Pub. Date: Jun. 23, 2022

(65) Prior Publication Data
　US 2024/0147016 A1　May 2, 2024

(30) Foreign Application Priority Data

Dec. 17, 2020　(KR) ........................ 10-2020-0177914

(51) Int. Cl.
　*H04N 21/25*　(2011.01)
　*H04N 21/258*　(2011.01)
　　(Continued)

(52) U.S. Cl.
　CPC ... *H04N 21/4826* (2013.01); *H04N 21/25866* (2013.01)

(58) Field of Classification Search
　None
　See application file for complete search history.

(56) References Cited

U.S. PATENT DOCUMENTS

| 2010/0011092 A1* | 1/2010 | Carpio .................... H04L 67/10 |
| | | 709/219 |
| 2014/0208350 A1* | 7/2014 | Krishnamurthy ...... G06Q 50/01 |
| | | 725/34 |
| 2016/0044349 A1* | 2/2016 | Jackson ........... H04N 21/25875 |
| | | 725/116 |

FOREIGN PATENT DOCUMENTS

| JP | 2014-199501 A | 10/2014 |
| KR | 10-2005-0049418 A | 5/2005 |

(Continued)

OTHER PUBLICATIONS

International Search Report dated Mar. 31, 2022 in International Application No. PCT/KR2021/019037.

*Primary Examiner* — Brian T Pendleton
*Assistant Examiner* — Jean D Saint Cyr
(74) *Attorney, Agent, or Firm* — Knobbe, Martens, Olson & Bear, LLP

(57)　ABSTRACT

A method in which a server provides a content recommendation list to a user terminal according to the present invention may comprise: a content information receiving step for receiving content information comprising one or more pieces of ranking information; a content group selection step for selecting, from among the content, a content group comprising a predetermined number of items of content by using one or more pieces of ranking information among the ranking information; a content recommendation list generation step for generating a content recommendation list comprising at least one item of content among the content included in the content group, on the basis of one or more pieces of ranking information different from the ranking information that was used in the content group selection step; and a content recommendation list providing step for providing the content recommendation list to the user terminal.

10 Claims, 8 Drawing Sheets

(51) Int. Cl.
  *H04N 21/466*  (2011.01)
  *H04N 21/475*  (2011.01)
  *H04N 21/482*  (2011.01)

(56)      References Cited

FOREIGN PATENT DOCUMENTS

| | | | |
|----|------------------|----|---------|
| KR | 10-2010-0022542 | A | 3/2010 |
| KR | 10-2010-0132705 | A | 12/2010 |
| KR | 10-2011-0134655 | A | 12/2011 |
| KR | 10-2012-0043569 | A | 5/2012 |
| KR | 10-2015-0041253 | A | 4/2015 |
| KR | 10-2017-0114673 | A | 10/2017 |
| KR | 10-2020-0067519 | A | 6/2020 |

* cited by examiner

S610 — Classify content released during period

S620 — Determine content satisfying condition

S630 — Compare whether number of content satisfying condition is less than predetermined number no → Select content group — S640 yes

S650 — Change period and condition

S660 — Classify content released during changed period

S670 — Determine content satisfying condition

S680 — Select content group

METHOD AND SERVER FOR PROVIDING CONTENT RECOMMENDATION LIST

CROSS-REFERENCE TO RELATED APPLICATION

This application claims priority to and the benefit of Korean Patent Application No. 10-2020-0177914, filed on Dec. 17, 2020, the disclosure of which is incorporated herein by reference in its entirety.

TECHNICAL FIELD

The present invention relates to a method and a server for providing a content recommendation list, and more specifically to a method and a server for providing a content recommendation list by synthesizing content ranking information.

BACKGROUND ART

In recent years, with the development of wireless Internet and mobile terminals, users have developed from a method of downloading and playing content such as music to a streaming method in order to enjoy content such as music. As the streaming method evolves, users can access more and more content, but on the contrary, it is difficult for users to search for content that suits their taste, and it is difficult to recognize trendy content. In order to solve this problem, the technology for recommending content according to the user's current emotional state is also developing.

Currently, many content recommendation techniques have a method of recommending content that is similar to the features of content frequently used by a user as much as possible. However, the content desired by the user may vary depending on the situation, and there is a problem in that it is difficult for a server including a recommendation algorithm or artificial intelligence to recognize such a situation every time, and thus, there is a disadvantage in that the utilization of the recommendation technology is low. In addition, since it is difficult for a user to access all the content due to a large amount of content, there may be content that is suitable for taste but is missed without being recognized.

In addition, most users currently use chart ranking information provided by content service providers in order to access the latest trendy content. This method of consuming content based on chart ranking information makes it difficult to access content such as new artists, and chart abusing issues may also exist. Accordingly, there is a need for a content recommendation method that provides an opportunity for users to access various content while breaking away from content consumption based on chart ranking information.

DISCLOSURE

Technical Tasks

A task to be solved by the present invention is to provide a method and a server for providing a content recommendation list for providing users with trendy content information that is recently gaining popularity in addition to chart ranking information.

Another task to be solved by the present invention is to provide a method and a server for providing a content recommendation list for recommending content that is suitable for a user's taste among content that the user has not yet recognized.

Another task to be solved by the present invention is to provide a method and a server for providing a content recommendation list that can introduce a mock-up sound source or unreleased song of content creators to a user.

Technical Solution

In order to solve the above tasks, the method for providing a content recommendation list according to the present invention, which is a method in which a server provides a content recommendation list to a user terminal includes a content information receiving step for receiving content information including one or more pieces of ranking information; a content group selection step for selecting, from among the content, a content group including a predetermined number of items of content by using one or more pieces of ranking information among the ranking information; a content recommendation list generation step for generating a content recommendation list including at least one item of content among the content included in the content group, on the basis of one or more pieces of ranking information different from the ranking information that was used in the content group selection step; and a content recommendation list providing step for providing the content recommendation list to the user terminal.

In an embodiment of the present invention, the ranking information may include at least one of content chart ranking information, ranking information on the number of times a user searches for the content and performs streaming and ranking information on the number of users who has streamed the content.

In an embodiment of the present invention, the content information may include release date information, and wherein the content group selection step may further include the steps of determining content that satisfies a predetermined condition based on the release date information and a result of comparing the day's ranking information and the previous day's ranking information for each item of the content; and selecting a content group including a predetermined number of content among the determined content.

In an embodiment of the present invention, the predetermined condition may include at least one of a fact that the day's ranking information is higher than the previous day's ranking information by a first standard or more, and a fact that the release date information is within a first period.

In an embodiment of the present invention, in the step of determining content, if the number of content satisfying the predetermined condition is M less than the predetermined number, the first standard and the first period may be changed to a 1-1 standard and a 1-1 period.

In an embodiment of the present invention, the method may further include the step of comparing the release date information and the day's ranking information and the previous day's ranking information for each item of the content to determine the M pieces of content that satisfy the changed conditions, and wherein the step of selecting a content group selects the content group including content that satisfies the predetermined condition and content that satisfies the changed condition.

In an embodiment of the present invention, the step of selecting a content group may further include the step of excluding content corresponding to a predetermined standard among the content.

In an embodiment of the present invention, the predetermined standard may be at least one of the genres of content.

In an embodiment of the present invention, the method may further include the step of classifying a priority content that satisfies a priority condition, wherein in the content recommendation list generation step, the priority content is generated by including the same in the content recommendation list with priority over content included in the content group.

In an embodiment of the present invention, the method may further include the step of classifying a priority content that satisfies a priority condition, wherein in the step of determining content, the predetermined condition is relaxed for the priority content.

Further, in order to solve the above tasks, the server for providing a content recommendation list according to the present invention, which provides a content recommendation list to a user terminal may include a communication unit; a content information receiving unit for receiving content information including one or more pieces of ranking information; a content group selection unit for selecting, from among the content, a content group including a predetermined number of items of content by using one or more pieces of ranking information among the ranking information; a content recommendation list generation unit for generating a content recommendation list including at least one item of content among the content included in the content group, on the basis of one or more pieces of ranking information different from the ranking information that was used in the content group selection step; and a content recommendation list providing unit for providing the content recommendation list to the user terminal.

In an embodiment of the present invention, the ranking information may include at least one of content chart ranking information, ranking information of the number of times a user searches for the content and performs streaming and ranking information of the number of users who has streamed the content.

In an embodiment of the present invention, the content information may include release date information, and wherein selecting the content group may determine content that satisfies a predetermined condition based on the release date information and a result of comparing the day's ranking information and the previous day's ranking information for each item of the content, and select a content group including a predetermined number of content among the determined content.

In an embodiment of the present invention, the predetermined condition may include at least one of a fact that the day's ranking information is higher than the previous day's ranking information by a first standard or more, and a fact that the release date information is within a first period.

In an embodiment of the present invention, when the content is determined, if the number of content satisfying the predetermined condition is M less than the predetermined number, the first standard and the first period may be changed to a 1-1 standard and a 1-1 period.

In an embodiment of the present invention, the content group selection unit may compare the release date information and the day's ranking information and the previous day's ranking information for each item of the content to determine the M pieces of content that satisfy the changed conditions, and wherein selecting the content group may select the content group including content that satisfies the predetermined condition and content that satisfies the changed condition.

In an embodiment of the present invention, the content group selection unit may exclude content corresponding to a predetermined standard among the content.

In an embodiment of the present invention, the predetermined standard may be at least one of the genres of content.

In an embodiment of the present invention, the server may further include a priority content classifying unit for classifying a priority content that satisfies a priority condition, wherein the content recommendation list generation unit generates the priority content by including the same in the content recommendation list with priority over content included in the content group.

In an embodiment of the present invention, the server may further include a priority content classifying unit for classifying a priority content that satisfies a priority condition, wherein the content group selection unit relaxes the predetermined condition for the priority content.

Advantageous Effects

The method and server for providing a content recommendation list according to an embodiment of the present invention have the effect of providing content that the user does not recognize by providing a content recommendation list to the user using the ranking information of the content.

In addition, the method and server for providing a content recommendation list according to an embodiment of the present invention have the effect of being able to provide content that other users currently enjoy a lot by recommending trendy content to the user.

In addition, the method and server for providing a content recommendation list according to an embodiment of the present invention have an effect that content creators can more easily introduce their content to users.

MODES OF THE INVENTION

Figure 1:
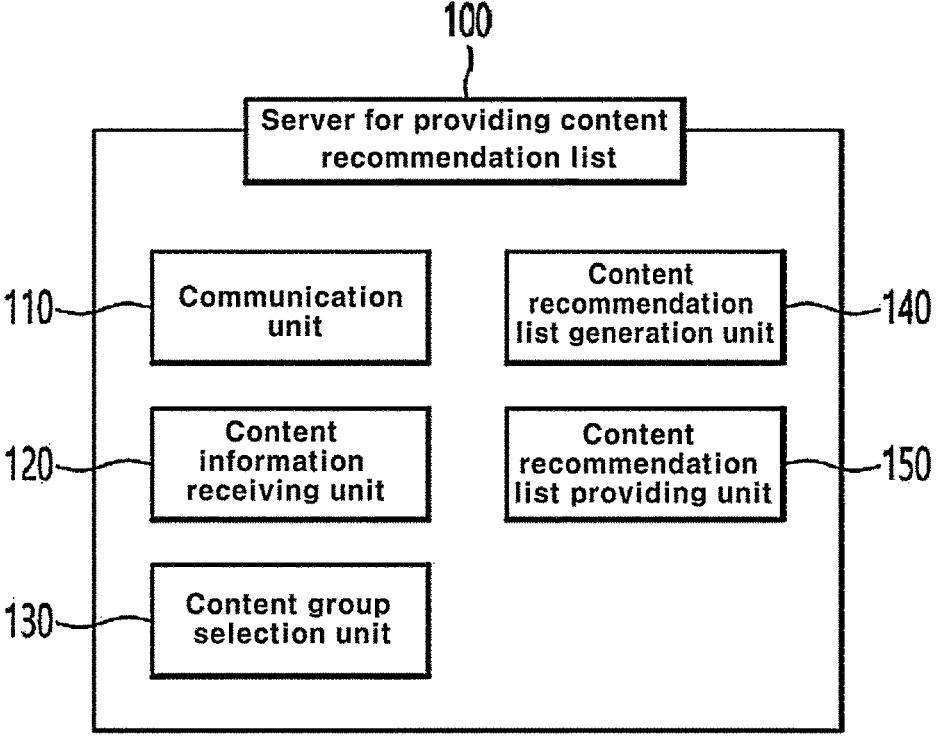
FIG. 1 is a block diagram of the server for providing a content recommendation list according to an embodiment of the present invention.

Hereinafter, the embodiments disclosed in the present specification will be described in detail with reference to the accompanying drawings, but the same or similar components are assigned the same reference numbers regardless of reference numerals, and the redundant description thereof will be omitted. The suffixes "module" and "unit" for components used in the following description are assigned or interchangeably used in consideration of only the ease of drafting the specification, and do not have distinct meanings or roles by themselves. Further, in terms of describing the embodiments disclosed in the present specification, if it is determined that the detailed descriptions of related known technologies may obscure the gist of the embodiments disclosed in the present specification, the detailed descriptions thereof will be omitted. In addition, the accompanying drawings are only for easy understanding of the embodiments disclosed in the present specification, and the technical idea disclosed herein is not limited by the accompanying drawings, and it should be understood that all changes, equivalents and substitutes included in the spirit and technical scope of the present invention are included.

Terms including an ordinal number such as first, second and the like may be used to describe various components, but the components are not limited by the terms. The above terms are used only for the purpose of distinguishing one component from another.

When a component is referred to as being "connected" to or "joined" with another component, it is understood that it may be directly connected to or joined with the other component, but it should be understood that other components may exist in between. On the other hand, when it is mentioned that a certain component is "directly connected" to or "directly joined" with another component, it should be understood that the other element does not exist in the middle.

The singular expression includes the plural expression unless the context clearly dictates otherwise.

In the present application, terms such as "include" or "have" are intended to designate that a feature, number, step, operation, component, part or combination thereof described in the specification exists, but it should be understood that this does not preclude the possibility of the presence or addition of one or more other features, numbers, steps, operations, components, parts or combinations thereof.

In the present specification, the communication method of the network is not limited, and the connection between each component may not be connected in the same network method. The network may include not only a communication method using a communication network (e.g., a mobile communication network, a wired Internet, a wireless Internet, a broadcasting network, a satellite network, etc.) but also short-range wireless communication between devices. For example, the network may include all communication methods through which an object and an object can network, and is not limited to wired communication, wireless communication, 3G, 4G, 5G or other methods. For example, a wired and/or network may refer to a communication network by at least one communication method selected from the group consisting of a Local Area Network (LAN), a Metropolitan Area Network (MAN), a Global System for Mobile Network (GSM), an Enhanced Data GSM Environment (EDGE), a High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), Wi-MAX (World Interoperability for Microwave Access) and ultrasound-based communication, but the present invention is not limited thereto.

The present invention relates to a method and a server for providing a content recommendation list to a user terminal.

The user terminal described in the present specification may include a mobile phone, a smart phone, a laptop computer, a terminal for digital broadcasting, personal digital assistants (PDA), a portable multimedia player (PMP), a navigation system, a slate PC, a tablet PC, an ultrabook, a wearable device (e.g., a watch-type terminal (smartwatch), a glass-type terminal (smart glass), a head mounted display (HMD), etc.) and the like.

The user terminal may include a communication module, and transmits and receives wireless signals with at least one of a base station, an external terminal and a server on a mobile communication network established according to the technical standards or communication methods for mobile communication (e.g., Global System for Mobilecommunication (GSM), Code Division Multi Access (CDMA), Code Division Multi Access 2000 (CDMA2000), Enhanced Voice-Data Optimized or Enhanced Voice-Data Only (EV-DO), Wideband (WCDMA) CDMA), High Speed Downlink Packet Access (HSDPA), High Speed Uplink Packet Access (HSUPA), Long Term Evolution (LTE), Long Term Evolution-Advanced (LTE-A), etc.).

Hereinafter, the method and server for providing a content recommendation list according to an embodiment of the present invention will be described with reference to FIGS. 1 to 9.

The method for providing a content recommendation list to a user terminal of the present invention is performed by a server for providing a content recommendation list.

FIG. 1 is a block diagram of the server for providing a content recommendation list according to an embodiment of the present invention.

Referring to FIG. 1, the server for providing a content recommendation list 100 performing the method for providing a content recommendation list includes a communication unit 110, a content information receiving unit 120, a content group selection unit 130, a content recommendation list generation unit 14 and a content recommendation list providing unit 150.

Hereinafter, the functions of each unit included in the server for providing a content recommendation list 100 will be described.

The communication unit 110 included in the server for providing a content recommendation list 100 may be connected to a user terminal or an external server through a network. In an embodiment, the external server may be a content server including content, and may be a content chart related server that determines the chart ranking of the content. The content information receiving unit 120 may receive content information including at least one or more pieces of ranking information through the communication unit 110. The content group selection unit 130 may select a content group including a predetermined number of content from among the content by using one or more pieces of the ranking information among the ranking information. The content recommendation list generation unit 140 may generate a content recommendation list including at least one item of the content included in the content group based on the ranking information used in the content group selection step and one or more other ranking information. The content recommendation list providing unit 150 may provide a content recommendation list to the user terminal through the communication unit 110.

Hereinafter, each step of the method for providing a content recommendation list according to an embodiment of the present invention will be described.

More specific functions of each unit will be described in detail below while explaining a method for providing content information.

The content described in the present specification may include music, video and the like, but the present invention is not limited thereto, and it may be any content provided to a user through a server. However, in the following description, it is assumed that the content is music for the convenience of explanation.

Figure 2:
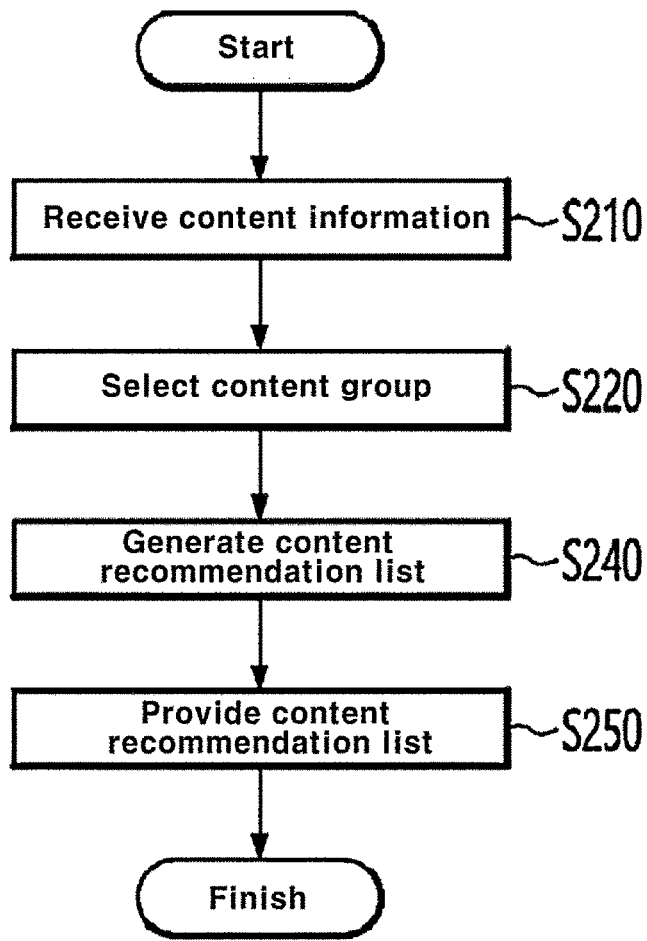
FIG. 2 is a flowchart of the method for providing a content recommendation list according to an embodiment of the present invention.

FIG. 2 is a flowchart of the method for providing a content recommendation list according to an embodiment of the present invention.

Referring to FIG. 2, the method for providing a content recommendation list may include a content information receiving step (S210), a content group selection step (S220), a content recommendation list generation step (S240) and a content recommendation list providing step (S250).

Each of the above-described steps may be performed irrespective of the listed order, except when performed in the listed order due to a special causal relationship. However, hereinafter, for the convenience of description, it is assumed that each of the above-described steps is performed according to the listed order.

Hereinafter, each step will be described in detail.

The content information receiving step (S210) is a step in which the content information receiving unit 120 receives content information including at least one or more pieces of ranking information. In an embodiment, the content information receiving unit 120 may receive the content information at a predetermined time during the day. In an embodiment, the content information receiving unit 120 may receive the content information at 9:00 am every day. The content information may include a plurality of ranking information, and in the present specification, for convenience, the first ranking information, the second ranking information and the third ranking information are defined and described. In this case, the first ranking information may be content chart ranking information. Herein, the content chart ranking information may be information indicating the popularity ranking of the content. Specifically, the content chart ranking may be a content ranking that is most played by content users in a specific time domain for each day, week, month or time zone. Alternatively, it may be a ranking in which the content is reproduced under various conditions, such as by genre and by age of the user. Further, in an embodiment, the second ranking information may be ranking information of the number of times a user searches for and streams content. Specifically, it may be a ranking for the number of times a user searches for content through a user terminal in a specific time domain and reproduces the searched content through streaming. The third ranking information may be ranking information of the number of users who have streamed the content. Specifically, it may be a ranking for the number of users who have played through streaming in a specific time domain. The first ranking information, the second ranking information and the third ranking information are not limited to the above-described examples, and the ranking information of the content may be defined by various methods for determining the order among a plurality of content.

The content information may include the above-described first ranking information, second ranking information and third ranking information. Specifically, content information may be all information related to content such as content title, genre, artist, personal information such as the artist's agency or age, composer, lyricist, content type, content popularity, content music video, content BPM, content highlight, the entire data of the content and the like. The server 100 may receive content information from a system including content information, such as an external server or an internal database, at a specific time every day through the communication unit 110. In an embodiment, the daily content chart ranking may be received at 10 am every day.

Alternatively, a weekly content chart ranking may be received every Monday at 9 am. In another embodiment, when the content is released, information such as a title of the content may be received, and updated information among content information may be periodically received.

The content group selection step (S220) is a step in which the content group selection unit 130 selects a content group including a predetermined number of content from among the content by using one or more pieces of ranking information among the ranking information. Specifically, the content group selection step (S220) may further include the steps of determining content that satisfies a predetermined condition based on the release date information and a result of comparing the day's ranking information and the previous day's ranking information for each item of the content; and selecting a content group including a predetermined number of content among the determined content.

In the method for providing a content recommendation list according to the present invention, the content group selection step (S220) may be performed once or more. In an embodiment, in the content group selection step, one content group may be selected by using one piece of ranking information, or one content group may be selected by using a plurality of pieces of ranking information. In another embodiment, in the content group selection step, a plurality of content groups may be selected by using one ranking information, and a plurality of content groups may be selected by using a plurality of ranking information. Specifically, the first content group may be selected by utilizing the first ranking information, and the second content group may be selected by utilizing the second ranking information.

In the present specification, for the convenience of explanation, it will be described by assuming that the content group selection step selects a first content group by utilizing the first ranking information (S220) and selects a second content group by utilizing the second ranking information (S230). In this case, the predetermined condition described above in the first content group selection step (S220) may include at least one of a fact that the first ranking information on the day is higher than the first ranking information of the previous day by a first standard or more, and a fact that the release date information is within a first period.

The step of determining content among the content group selection step may be divided into a step of classifying the content based on any one of the release date and the ranking information and a step of determining the content. The step of classifying the content and the step of determining the content may be performed irrespective of the listed order, except for a case where they must be performed in the listed order due to a special causal relationship. Specifically, first of all, after classifying the content based on the release date, the classified content may be determined based on the ranking information. Alternatively, after first classifying the content based on the ranking information, the classified content may be determined based on the ranking information. In addition, it is also possible to simultaneously perform based on the release date and ranking information. In the present specification, for the convenience of explanation, it will be described by assuming that the content is classified based on the release date, and then, the classified content is determined based on the ranking information.

The step of classifying the content is a step in which the content group selection unit 130 classifies the content released in the first period among the content. In an embodiment, the first period may be a period determined by the content service provider, such as within 30 days, within 60 days, within 90 days and the like, from the content release date. The content group selection unit 130 may classify the content corresponding to the first period among the content received in the content information receiving step (S210).

The step of determining the content is a step in which the content group selection unit 130 determines the content satisfying the first condition based on a result of comparing the day's first ranking information and the first ranking information of the previous day of each classified content. In an embodiment, the first ranking information may be content chart ranking information indicating the popularity ranking of daily content. In this case, the first ranking information of the content A on the day may be $300^{th}$, which is the content playback ranking from 9:00 am on Nov. 11, 2020 to 9:00 am on Nov. 12, 2020, and the first ranking information of the previous day may be $380^{th}$, which is the content playback ranking from 9:00 am on Nov. 10, 2020 to 9:00 am on Nov. 11, 2020. The content group selection unit 130 may compare the first ranking information on the day of each of the first classified content and the first ranking information on the previous day. Comparing the first ranking information may be comparing whether the day's first ranking information has gone up by more than a predetermined standard compared to the first ranking information of the previous day. Herein, the first condition may be a standard determined by the content service provider, such as an increase of 50 places from the previous day, an increase of 100 places from the previous day and the like. Specifically, as in the above example, when the first ranking information of the content A on the day is $340^{th}$ and the first ranking information of the previous day is $380^{th}$, as in the above example, the first ranking information of the content A on the day goes up by 40 places compared to the previous day. In this case, when the first condition is 50 places higher than the previous day, the content group selection unit 130 may determine that the content A does not satisfy the first condition. In another embodiment, if the first ranking information of the content A on the day is $120^{th}$ and the first ranking information of the previous day is $210^{th}$, the first ranking information of the content A on the day goes up by 90 places compared to the previous day. In this case, if the first condition is 100 place higher than the previous day, the content group selection unit 130 may determine that the content A satisfies the first condition.

The step of selecting the first content group is a step in which the content group selection unit 130 selects a first content group including a first predetermined number of content from among the content determined to satisfy the first condition. In an embodiment, the first number may be a number determined in advance by the server 100. For example, when the first number is determined to be 40, if the number of content determined by the content group selection unit 130 to satisfy the first condition is 50, the content group selection unit 130 may select the first content group including 40 content, which is the first number among 50 items of content. In this case, of the 50 items of content may be randomly selected, and they may be selected according to other standard. Specifically, the other standard may calculate a score with respect to the degree to which the first condition is satisfied, and the top 40 having a high score may be selected. The score with respect to the degree to which the first condition is satisfied may be a score determined for the degree to which the day's first ranking information has increased more than the previous day. Alternatively, the content group selection unit 130 may determine the first number as the number of content determined to satisfy the first condition. For example, if the number of content determined by the content group selection unit 130 to satisfy the first condition is 50, the content group selection unit 130 may determine the first number to be 50, and select a first content group including all of 50 items of content that satisfy the first condition.

In addition, the content group selection unit 130 may not include the corresponding content in the first content group when the first ranking information on the day is $100^{th}$ or higher among the content satisfying the first condition. Specifically, assuming that the content A rose 120 places from $150^{th}$ in the previous day's first ranking information to $30^{th}$ in the day's first ranking information, even if the content A satisfies the first condition because the first condition is an increase in rank by 100 places compared to the previous day, the content group selection unit 130 may not include the content A in the first content group, because the day's first ranking information is $30^{th}$, which is higher than $100^{th}$.

Specific examples will be described below in more detail below.

The second content group selection step (S230) is a step in which the content group selection unit 130 selects a second content group including a second predetermined number of content among content based on the second ranking information. Specifically, the second content group selection step (S230) may further include the steps of classifying content released in a second period among the content, comparing the second ranking information of each classified content on the same day with the second ranking information of the previous day to determine content that satisfies the second condition, and selecting a second content group including a second number of content among the determined content.

The step of classifying the content included in the second content group selection step (S230) may be the same as the step of classifying the content included in the first content group selection step (S220) as described above. Specifically, the first period and the second period may be the same or may be different periods according to the determination of the server 100.

The step of determining the content is a step in which the content group selection unit 130 determines the content that satisfies the second condition based on a result of comparing the second ranking information of the same day and the second ranking information of the previous day of each classified content. In an embodiment, the second ranking information may be ranking information about the number of times a user searches for content through a user terminal in a specific time domain and plays the searched content through streaming. In the step of determining the content included in the second content group selection step (S230), only the first ranking information and the second ranking information for comparing with the step of determining the content included in the first content group selection step (S220) may be different. Specifically, the first content group selection step (S220) may be determined by the first ranking information, which is the content chart ranking information indicating the daily content popularity ranking, and the second content group selection step (S230) may be determined by the second ranking information, which is ranking information about the number of times a user searches for content through a user terminal in a specific time domain and plays the searched content through streaming.

The step of selecting the second content group included in the second content group selection step (S230) may be the same as the step of selecting the first content group included in the first content group selection step (S220). Specifically, the first number and the second number may be the same or may be different according to the determination of the server 100. Specifically, the first number and the second number may be determined to have a specific ratio. For example, the first number and the second number may be determined to be 40 and 10 at a ratio of 8:2.

In the present specification, for convenience, although it has been described that the second content group selection step (S230) is performed after the first content group selection step (S220), the present invention is not limited thereto, and the step (S230) may be performed first and simultaneously performed in parallel.

The content recommendation list generation step (S240) is a step in which the content recommendation list generation unit 140 generates a content recommendation list including at least one item of the content included in the first content group and the second content group based on the third ranking information. In an embodiment, the third ranking information may be ranking information of the number of users who have played through streaming in a specific time domain. Alternatively, the third ranking information may be other ranking information for determining the content to be included in the content recommendation list by comparing the content included in the content group with each other. Specifically, the third ranking information may include feedback information of the user on the content, for example, the number of comments by the user on the content, and the number that the user selects a 'Like' display. Alternatively, the third ranking information may be the number of streams in a specific time domain, the number of searches or the number of recommendations made by the user to other users. The content recommendation list generation unit 140 may generate a content recommendation list including a predetermined number of content by arranging all of the content included in the first and second content group according to the third ranking information. In an embodiment, assuming that the number of content included in the first content group is 60 and the second number is 50, the content recommendation list generation unit 140 generates 110 content by adding the first number and the second number such that it is possible to generate a content recommendation list including the top 50 items of content, which is a predetermined number, by sorting in the order of the number of users who have played through streaming in a specific time domain. Alternatively, the content recommendation list generation unit 140 may generate a content recommendation list including a predetermined number of content by arranging the first content group and the second content group according to the third ranking information, respectively, based on the third ranking information. In an embodiment, it is assumed that the first number is 60 and the number of content included in the second content group is 50, and a predetermined number of 50 may be determined. In this case, the content recommendation list generation unit 140 may generate a content recommendation list by extracting 40 pieces from the first content group and 10 pieces from the second content group out of a predetermined number of 50 pieces. Specifically, the content recommendation list generation unit 140 may extract the top 40 content by sorting 60 content included in the first content group by the number of users who have played the same through streaming in a specific time domain, and extract top 10 content by sorting 50 items of content included in the second content group by ranking of the number of users who have placed the same through streaming in a specific time domain, so as to generate a content recommendation list including a total of 50 items of content.

The content recommendation list providing step (S250) is a step in which the content recommendation list providing unit 150 provides the content recommendation list to the user terminal through the communication unit 110.

The content recommendation list providing unit 150 may provide the content recommendation list generated in the content recommendation list generation step (S240) to the user terminal. In this case, the user terminal may provide at least a part of the content recommendation list to the user. Specifically, the user terminal may receive a content recommendation list including 50 items of content from the server 100 and provide all of the 50 items of content to the user, and the server 100 randomly selects 31 of these and provides the same to the user. Alternatively, out of the 50 items of content, 31 content may be randomly selected and provided each time the user accesses the provided content recommendation list. As shown in the above example, the content recommendation list provided by the server 100 to the user terminal based on ranking information such as daily content chart ranking may be updated daily and provided to the user.

Figure 3:
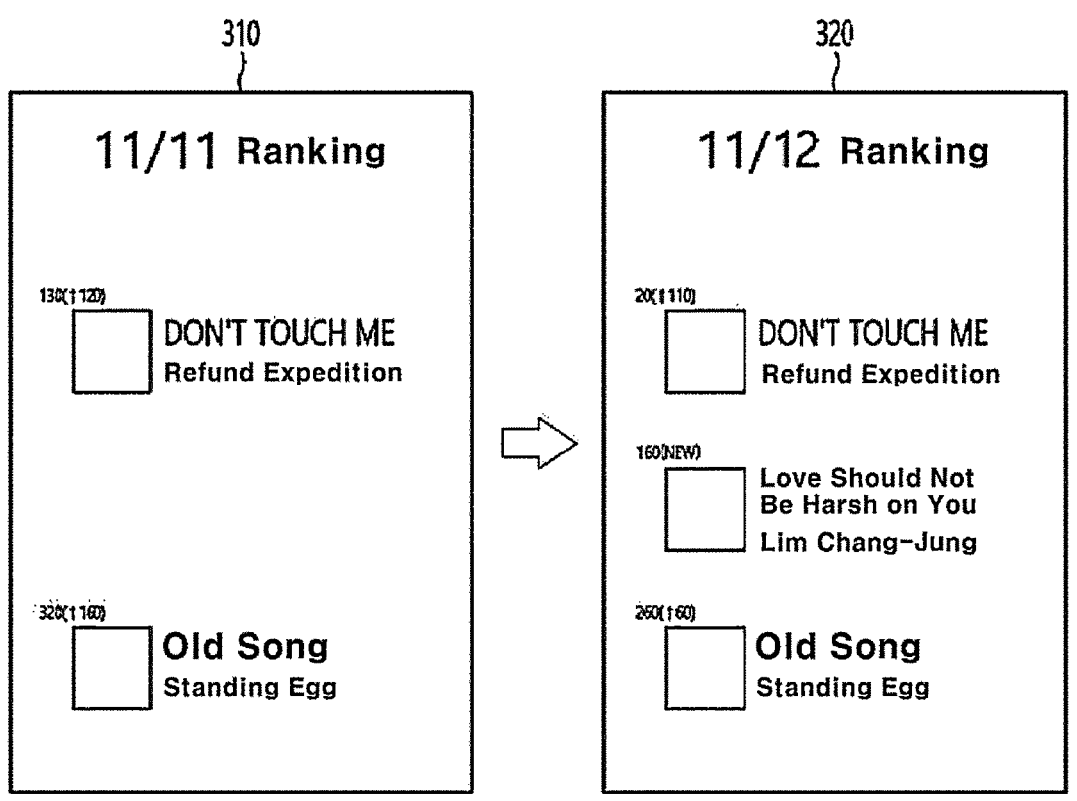
FIG. 3 is a diagram showing the ranking information of content in the method for providing a content recommendation list according to an embodiment of the present invention.

FIG. 3 is a diagram showing the ranking information of content in the method for providing a content recommendation list according to an embodiment of the present invention.

The content ranking information may be a content ranking that is most played by content users in a specific time domain for each day, week, month or time zone. Part of the content ranking information may be provided through the user terminal. For example, the daily basis content ranking information may be provided to the user through the user terminal from $1^{st}$ to the top $100^{th}$. However, content that is not included in the top 100 may be stored in the server or database even if they are not provided through the user terminal. Referring to FIG. 3, it shows the previous day's ranking information 310 and the day's ranking information 320 on a daily basis. For example, the content ranking information of the 'Refund Expedition—DON'T TOUCH ME' content in the previous day's ranking information 310 is $130^{th}$. On the other hand, in the day's ranking information 320, the content ranking information is $20^{th}$. In this way, the server 100 may receive the content ranking information from the system including the content information at a specific time every day and compare the previous day's ranking information 310 and the day's ranking information 320. In addition, referring to the day's ranking information 320, the content ranking information of the content 'Lim Chang-Jung—Love Should Not Be Harsh on You' is $160^{th}$. On the other hand, when the content is released and the ranking information is generated for the first time, the day's ranking information 320 may exist but the previous day's ranking information 310 may not exist. In this case, the server 100 may not compare the previous day's ranking information 320 with the day's ranking information 310 of the content 'Lim Chang-Jung—Love Should Not Be Harsh on You.' Further, in the previous day's ranking information 310, the content ranking information of the 'Standing Egg—

13

Old Song' content is ranked 320$^{th}$. On the other hand, in the day's ranking information 320, the content ranking information is 260$^{th}$.

Assuming that the ranking shown in FIG. 3 is the first content ranking information, and in the example of the above-described first content group selection step (S220), when the first condition is an increase of 100 places compared to the previous day, the content group selection unit 130 may include the 'Refund Expedition—DON'T TOUCH ME' and 'Standing Egg—Old Song' content in the first content group. However, as in the other example described above, the content group selection unit 130 may not include the corresponding content in the first content group when the day's first ranking information is 100$^{th}$ or higher among the content satisfying the first condition. In this case, the content group selection unit 130 may not include the 'Refund Expedition—DON'T TOUCH ME' content in the first content group.

Figure 4:
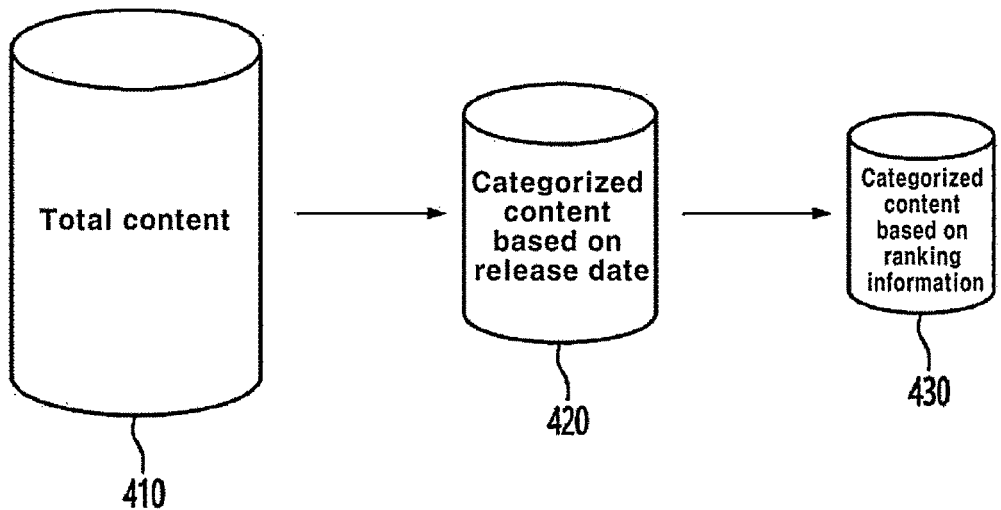
FIG. 4 is a diagram showing content classification in the method for providing a content recommendation list according to an embodiment of the present invention.

FIG. 4 is a diagram showing content classification in the method for providing a content recommendation list according to an embodiment of the present invention.

Referring to FIG. 4, an example of the first content group selection step (S220) and the second content group selection step (S230) is shown in detail. The total content 410 may be all content received by the content information receiving unit 120 through the communication unit 110.

For example, the total content 410 may be all music included in a content server of a music service provider.

The classified content 420 based on the release date is content in which the content group selection unit 130 classifies the content released in the first period or the second period among the total content 410. In an embodiment, when the number of the total content 410 is 30,000 and the content service provider or server 100 determines the first period to be 30 days from the release date, the number of the classified content 420 based on the release date may be 500 among the total content 410 of 30,000. Alternatively, when the number of the total content 410 is 30,000 and the content service provider determines that the first period is 10 days from the release date, the number of classified content 420 based on the release date may be 80 out of the total content of 30,000. In this case, when the number of classified content 420 based on the release date is less than a predetermined number, the content group selection unit 130 may change the first period. Specifically, when the number of classified content 420 based on the release date is determined in advance to be 300 or more, if the first period is determined to be 10 days from the release date and the first classification is performed, the number of classified content 420 based on the release date may be 80, which may not meet the standard of 300. In this case, the content group selection unit 130 changes the first period from 10 days from the release date to 30 days from the release date, and when the first classification is performed, the number of classified content 420 based on the release date is 500, which satisfy the standard of 300.

The classified content 430 based on the ranking information is content in which the classified content 420 based on the release date is classified, based on the results of the content group selection unit 130 comparing the day's first ranking information and the previous day's first ranking information for each classified content 420 based on the release date. In an embodiment, if the number of classified content 420 based on the release date is 500, the content group selection unit 130 may compare the day's first ranking information and the previous day's first ranking information for each of the 500 content. As shown in the above example, comparing the first ranking information may mean comparing whether the day's first ranking information has gone up above the first condition compared to the previous day's first ranking information.

Alternatively, if the first condition is determined to go up by 50 places or more, the classified content 430 based on ranking information may be 60 out of 500 classified content 420 based on the release date. In this case, if the number of classified content 430 based on ranking information is less than a predetermined number, the content group selection unit 130 may change the first condition. More specifically, when the number of classified content 430 based on ranking information is predetermined to be 50 or more, if the first condition is determined to go up by 100 places or more and classified, the number of classified content 430 based on ranking information may be 20, which may not satisfy the standard of 50. In this case, if the content group selection unit 130 changes the first condition from an increase in ranking of 100 places or more to an increase in ranking of 50 places or more, the number of classified content 430 based on ranking information becomes 60, which satisfy the standard of 50. For the convenience of explanation, the present specification has been drafted such that the classified content 420 based on the release date is classified from the total content 410, and the classified content 430 based on ranking information is classified from the classified content 420 based on the release date, but the present invention is not limited thereto as described above. Specifically, it is also possible to classify the classified content 430 based on ranking information from the total content 410 and the classified content 420 based on release date from the classified content 430 based on ranking information.

Figure 5:
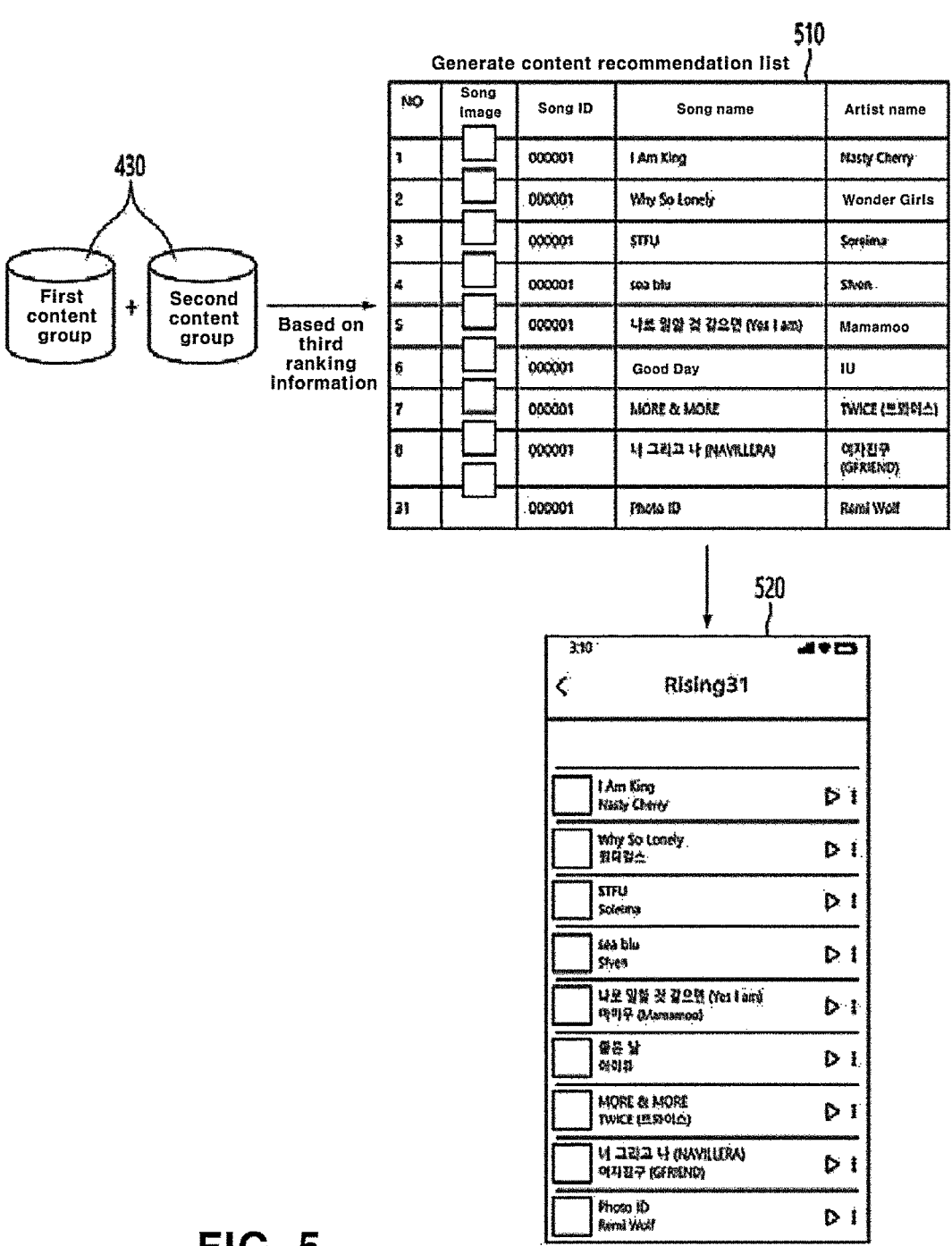
FIG. 5 is a diagram showing an example of generating a content recommendation list in the method for providing a content recommendation list according to an embodiment of the present invention.

FIG. 5 is a diagram showing an example of generating a content recommendation list in the method for providing a content recommendation list according to an embodiment of the present invention.

The content recommendation list generation unit 140 may generate (510) a content recommendation list including at least one item of the content included in the first content group and the second content group based on the third ranking information. In an embodiment, when the number of content included in the first content group and the second content group is 60, the content recommendation list may be generated as 31 items including at least some songs among the 60 items. Specifically, when the number of content 430 included in the first content group and the second content group is 60, the content recommendation list generation unit 140 determines the top 31 in the order of the third ranking information of each of the 60 items of content, so as to generate (510) a content recommendation list. The content recommendation list may include information such as the title of the content, the artist of the content, unique information of the content, an image related to the content, the order of the content and the like.

The content recommendation list providing unit 150 may provide (520) the content recommendation list generated through the communication unit 110 to the user terminal. In this case, the user terminal may provide at least a part of the content recommendation list to the user through a display included in the user terminal. The content order of the content recommendation list provided to the user may be arbitrarily changed and provided whenever the user accesses the content recommendation list.

Figure 6:
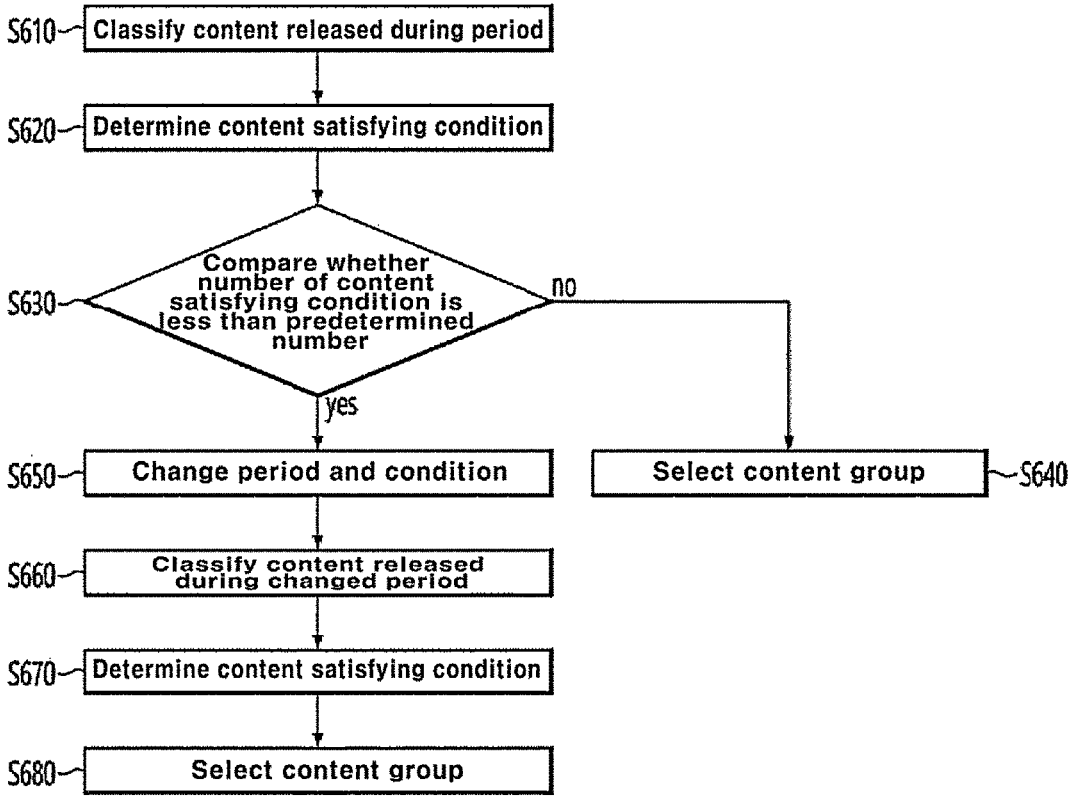
FIG. 6 is a flowchart of the method for providing a content recommendation list according to an embodiment of the present invention.

FIG. 6 is a flowchart of the method for providing a content recommendation list according to an embodiment of the present invention.

Referring to FIG. 6, in the content group selection steps (S220, S230), the content group selection unit 130 may compare whether the number of content satisfying a condition is less than a predetermined number (S630). For example, the server 100 may classify (S610) the content released in the first period in the first content group selection step (S220). Thereafter, the first number, which is the number of content included in the first content group, is determined, and the content group selection unit 130 may determine content that satisfies the first condition, based on the results of comparing the day's first ranking information of each classified content with the previous day's first ranking information (S620). In this case, it may be greater than or equal to the determined first number of content. In this case, the content group selection unit 130 may select a first content group including the first number of content (S640).

On the other hand, although the server 100 determines the first number, the number of content determined by the content group selection unit 130 to satisfy the first condition may be less than the first number.

Specifically, if the number of content satisfying the first condition is M less than the first number, the content group selection unit 130 may change the first period and the first condition to a 1-1 period and a 1-1 condition, respectively (S650). In this case, the content group selection unit 130 may classify content released during the changed period (S660) and determine content that satisfies the changed conditions (S670). Specifically, the content group selection unit 130 may determine M content that satisfy the 1-1 condition by comparing the day's first ranking information and the previous day's first ranking information for each content released in the 1-1 period. Thereafter, the content group selection unit 130 may select a content group including content that satisfy the original condition and content that satisfy the changed condition (S680). Specifically, it is possible to select a first content group including a first number of content including (first number—M) items of content that satisfy the first condition, which is the original condition, and M items of content that satisfy the first condition, which is the changed condition. The above-described example may be equally applied to the first content group selection step (S220) and the second content group selection step (S230).

Figure 7:
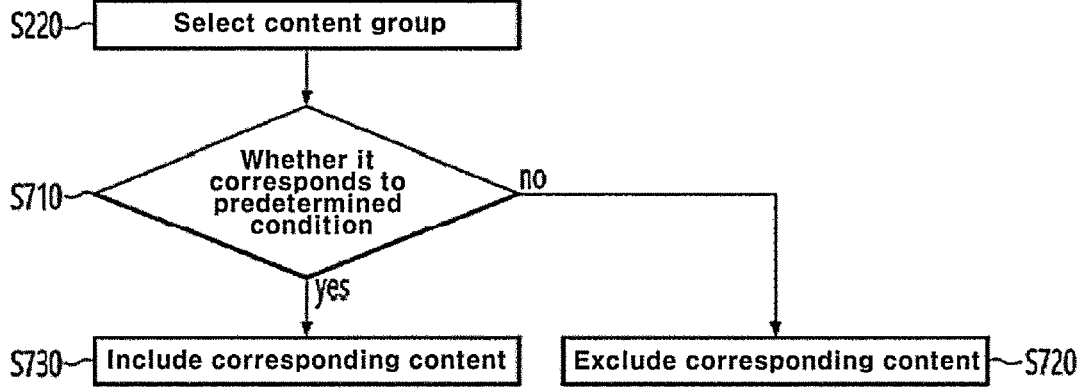
FIG. 7 is a flowchart of the method for providing a content recommendation list according to an embodiment of the present invention.

FIG. 7 is a flowchart of the method for providing a content recommendation list according to an embodiment of the present invention.

Referring to FIG. 7, in the first content group selection step (S220) and the second content group selection step (S230), it may be determined whether the content corresponds to a predetermined condition (S710). In an embodiment, the predetermined condition may be the genre of the content, the content of the content, whether the artist of the content overlaps, whether the content is the same content included in several albums, whether the content is continuously exposed and the like. The content group selection unit 130 may exclude (S730) the content corresponding to the predetermined condition from any one of the total content 410, the classified content 420 based on the release date or the classified content 430 based on the ranking information. Specifically, if the genre of content is CCM, religious music, traditional Korean music, kids' music, music therapy, adult music, J-POP and the like, even if the content meets the release date criteria in the first content group selection step (S220), the content group selection unit (130) may exclude the same from the classified content 420 based on the release date. In another embodiment, when the content is a sound source without lyrics, if the content is a duplicate sound source included in several albums, the other sound sources except for one may be excluded from the classified content 420 based on the release date. In another embodiment, the content included three or more times in the content recommendation list provided to the user terminal, the content included for three consecutive days and the like may be excluded from the classified content 420 based on the release date thereafter. Conversely, the content group selection unit 130 may include the content that does not correspond to the predetermined condition in the classified content 420 based on the release date (S720).

Figure 8:
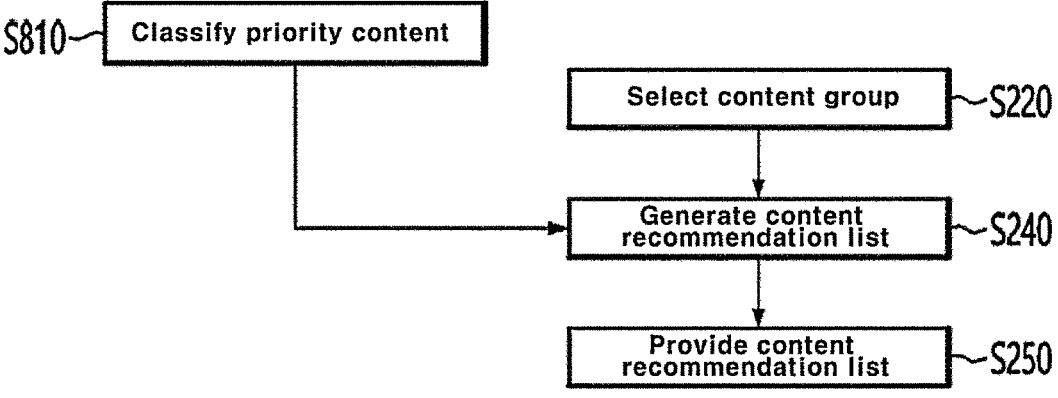
FIG. 8 is a flowchart of the method for providing a content recommendation list according to an embodiment of the present invention.

FIG. 8 is a flowchart of the method for providing a content recommendation list according to an embodiment of the present invention.

Referring to FIG. 8, the first content group selection step (S220) may include a priority content classification step (S810).

The priority content classification step (S810) is a step in which the content group selection unit 130 classifies the priority content that satisfies the priority condition. Herein, the priority content is content such as mock-up sound sources and unreleased songs of artists, and may refer to content that is directly provided by the artists to the content service provider. In an embodiment, the content group selection unit 130 may classify the content included in the content server as priority content through a separate path provided to the artist by the content service provider. In another embodiment, the content group selection unit 130 may classify the artist's content uploaded to the content server through the separate path provided by the content service provider as a priority content.

The content recommendation list generation unit 140 may generate a content recommendation list by preferentially including the priority content classified in the content classification step S810 rather than the content included in the first content group and the second content group. In this case, the number of priority content preferentially included in the content recommendation list may be less than or equal to a predetermined number. Specifically, when 31 items of content are included in the content recommendation list as in the above-described example, the number of priority content preferentially included in the content recommendation list may be 3. In this case, the content recommendation list generation unit 140 may generate a content recommendation list including 28 items of content from the first and second content groups among the 31 items of content and 3 items of the classified priority content.

Alternatively, the content recommendation list generation unit 140 may generate a content recommendation list including at least one of a priority content group including priority content and content included in the first content group and the second content group. In this case, as described above, the first content group and the second content group may be selected according to a predetermined condition, and the priority content group may be selected according to a more relaxed condition than the predetermined condition. Specifically, if the predetermined condition applied to the first content group and the second content group goes up by 50 places or more compared to the previous day, within 30 days of release and the like, the relaxed condition applied to the priority content group goes up by 10 places or more compared to the previous day, within 90 days of release and the like.

Alternatively, when the content recommendation list generation unit 140 generates a content recommendation list, the content included in the priority content group may be given a weight. Specifically, as described above, when a content recommendation list is generated based on the ranking information of the number of users who have played through streaming in a specific time domain, which is the third ranking information, the content included in the priority content group may be compared with the third ranking information of the content included in another content group by multiplying the ranking information of the number of users who have played the same through streaming in a specific time domain by 2. Through the above-described example and the like, the priority content may be preferentially included in the content recommendation list.

Although not illustrated in the drawings, the content recommendation list generation step (S240) may further include the steps of identifying a content having the same unique information among the classified content 430 based on ranking information, and selecting one content of at least two content based on the third ranking information if there are at least two content having the same unique information. In an embodiment, the unique information may be an artist of the content, an album name including the content, an artist's agency and the like. Specifically, when the unique information is the artist of the content, a plurality of content having the same artist among the classified content 430 based on the ranking information 430 may exist. In this case, the content recommendation list generation unit 140 may determine one content based on the third ranking information among the plurality of content. More specifically, it is possible to determine one content among the plurality of content that the user searches for content through the user terminal in a specific time domain and plays the searched content through streaming with a large number of times. The content recommendation list generation unit 140 may generate a content recommendation list including one determined content.

Although not illustrated in the drawings, it is possible that the second content group selection step (S230) is performed based on the first content group selected in the first content group selection step (S220). For example, a first content group including a predetermined first number of content is selected among all content based on the first ranking information, and a second content group including a predetermined second number of content is selected among the content included in the first content group based on the second priority information, so as to generate a content recommendation list including at least one of the second content group.

As described above, the embodiments of the method and server for providing a content recommendation list according to the present invention have been described. The technical features disclosed in each embodiment of the present invention are not limited only to the embodiments, and unless they are mutually incompatible, the technical features disclosed in each embodiment may be combined and applied to different embodiments.

The present invention is not limited to the above-described embodiments and the accompanying drawings, and various modifications and variations will be possible from the point of view of those of ordinary skill in the art to which the present invention pertains. Accordingly, the scope of the present invention should be defined not only by the scope of claims of the present specification, but also by the scope of claims and the equivalents thereof.

The present invention described above may be implemented as computer-readable code (or application or software) on a medium in which a program is recorded. The above-described generating method may be realized by a code stored in a memory or the like.

The computer-readable medium includes all types of recording devices in which data readable by a computer system is stored. Examples of the computer-readable medium include Hard Disk Drive (HDD), Solid State Disk (SSD), Silicon Disk Drive (SDD), ROM, RAM, CD-ROM, magnetic tape, floppy disk, optical data storage device and the like, and it includes being implemented in the format of a carrier wave (e.g., transmission over the Internet). In addition, the computer may include a processor or a control unit. Accordingly, the above detailed description should not be construed as restrictive in all respects but as being examples. The scope of the present invention should be determined by a reasonable interpretation of the appended claims, and all modifications within the equivalent scope of the present invention are included in the scope of the present invention.

INDUSTRIAL APPLICABILITY

The method and server for providing a content recommendation list according to the present invention may be used in a digital device, a platform business server, a digital cloud and the like.

The invention claimed is:

1. A method for providing a content recommendation list, which is a method in which a server provides a content recommendation list to a user terminal, comprising:

a content information receiving step for receiving content information comprising at least three different types of ranking information including first information, second information and third information;

a content group selection step comprising:

selecting a first content group comprising a first predetermined number of items of content from among the content by using the first ranking information, selecting a second content group comprising a second predetermined number of items of content from among the content by using the second ranking information, determining content that satisfies a predetermined condition based on release date information and a result of comparing the day's ranking information and the previous day's ranking information for each item of the content, and when a number of contents satisfying the predetermined condition is less than the predetermined number, changing the predetermined condition to a relaxed condition;

a content recommendation list generation step for generating a content recommendation list comprising at least one item of content from the first content group and at least one item of content from the second content group on the basis of third ranking information different from the first ranking information and the second ranking information; and a content recommendation list providing step for providing the content recommendation list to the user terminal, wherein the relaxed condition is a condition in which at least one of a ranking change threshold based on the comparison between the day's ranking information and the previous day's ranking information, and a release date threshold based on the release date information, is set to be less restrictive than that of the predetermined condition.

2. The method of claim 1, wherein the step of selecting a content group further comprises the step of:

excluding content corresponding to a predetermined standard among the content.

3. The method of claim 2, wherein the predetermined standard is at least one of the genres of content.

4. The method of claim 1, further comprising the step of: classifying a priority content that satisfies a priority condition, wherein in the content recommendation list generation step, the priority content is generated by comprising the same in the content recommendation list with priority over content comprised in the content group.

5. The method of claim 1, further comprising the step of: classifying a priority content that satisfies a priority condition, wherein in the step of determining content, the predetermined condition is relaxed for the priority content.

6. A server for providing a content recommendation list, which provides a content recommendation list to a user terminal, comprising:

a communication unit;

a content information receiving unit for receiving content information comprising at least three different types of ranking information including a first information, a second information, a third information and a release date information;

a content group selection unit configured to:

select a first content group comprising a first predetermined number of items of content from among the content by using the first ranking information;

select a second content group comprising a second predetermined number of items of content from among the content by using the second ranking information;

determine content that satisfies a predetermined condition based on the release date information and a result of comparing the day's ranking information and the previous day's ranking information for each item of the content; and when the number of contents satisfying the predetermined condition is less than the predetermined number, relax the predetermined condition to select a content group comprising the predetermined number of content items;

a content recommendation list generation unit for generating a content recommendation list comprising at least one item of content from the first content group and at least one item of content from the second content group, on the basis of the third ranking information different from the first ranking information and the second ranking information; and a content recommendation list providing unit for providing the content recommendation list to the user terminal, wherein the relaxed condition is a condition in which at least one of a ranking change threshold based on the comparison between the day's ranking information and the previous day's ranking information, and a release date threshold based on the release date information, is set to be less restrictive than that of the predetermined condition.

7. The server of claim 6, wherein the content group selection unit excludes content corresponding to a predetermined standard among the content.

8. The server of claim 7, wherein the predetermined standard is at least one of the genres of content.

9. The server of claim 6, further comprising:

a priority content classifying unit for classifying a priority content that satisfies a priority condition, wherein the content recommendation list generation unit generates the priority content by comprising the same in the content recommendation list with priority over content comprised in the content group.

10. The server of claim 6, further comprising:

a priority content classifying unit for classifying a priority content that satisfies a priority condition, wherein the content group selection unit relaxes the predetermined condition for the priority content.

* * * * *